(12) United States Patent
Furuyama (10) Patent No.: US 6,961,523 B2
(45) Date of Patent: Nov. 1, 2005

(54) OPTICAL MULTIPLEXING INTERCONNECT MODULE

(75) Inventor: Hideto Furuyama, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 233 days.

(21) Appl. No.: 10/375,353

(22) Filed: Feb. 28, 2003

(65) Prior Publication Data

US 2003/0231823 A1    Dec. 18, 2003

(30) Foreign Application Priority Data

Feb. 28, 2002  (JP) ............................. 2002-054233

(51) Int. Cl.[7] .............................................. H04B 10/04
(52) U.S. Cl. .................... 398/154; 398/42; 398/52; 398/90; 398/189
(58) Field of Search ....................... 398/34, 42, 52, 398/90, 154

(56) References Cited

U.S. PATENT DOCUMENTS 4,225,752 A * 9/1980 Looschen ................... 398/154
6,519,607 B1 * 2/2003 Mahoney et al. ......... 707/104.1

FOREIGN PATENT DOCUMENTS

JP      7-58721     3/1995
JP      11-196069   7/1999

OTHER PUBLICATIONS

Atsushi Takai, et al. "800Mbit/s/ch×12ch, True DC-Coupled Parallel Optical Interconnects Using Single-Mode Fiber and 1310 nm LD Array" 2000 Electronic Components and Technology Conference, 2000, pp. 491-496.

Yasuhiko Kuriyama, et al. "15 GBPS MUX/DMUX Implemented With AlGaAs/GaAs HBTS" 11th Annual GaAs IC Symposium Technical Digest, 1989, pp. 313-316.

Rodney S. Tucker, et al. "Optical Time-Division Multiplexing for Very High Bit-Rate Transmission," Journal of Lightwave Technology, vol. 6, No. 11, Nov. 1988, pp. 1737-1749.

* cited by examiner

Primary Examiner—Leslie Pascal
(74) Attorney, Agent, or Firm—Oblon, Spivak, McClelland, Maier & Neustadt, P.C.

(57) ABSTRACT

In an optical multiplexing interconnection module, first and second NRZ input signals synchronous by clock signal are inputted to its input section. The first NRZ input signal is converted to a first RZ signal according to a logical product with a clock signal CLK by a drive circuit and the second NRZ input signal is converted to a second RZ signal according to a logical product with an inversion clock signal by a drive circuit. Then, light emitting devices are driven according to the first and second RZ signals from these drive circuits and two optical signals from the light emitting devices are inputted to an optical channel and multiplexed therein and then, a multiplexed optical signal is transmitted through an optical channel.

8 Claims, 7 Drawing Sheets

FIG. 10A  Data1

FIG. 10B  Data2

FIG. 10C  Data3

FIG. 10D  Data4

FIG. 12A 
OCH A

FIG. 12B 
OCH B

OPTICAL MULTIPLEXING INTERCONNECT MODULE

CROSS-REFERENCE TO RELATED APPLICATIONS

This application is based upon and claims the benefit of priority from the prior Japanese Patent Application No. 2002-054233, filed Feb. 28, 2002, the entire contents of which are incorporated herein by reference.

BACKGROUND OF THE INVENTION

1. Field of the Invention

The present invention relates to an optical interconnect module that transmits optical signals at high speed through a transmission channel or path over a relatively short distance. More particularly, the invention relates to an optical multiplexing interconnect module that multiplexes a plurality of signals and distributes them through an optical transmission channel.

2. Description of the Related Art

In recent years, electric interconnection has reached a limit of practical use. This is because the performance of electronic devices, such as bipolar transistors and field-effect transistors, has increased very much. It is proposed that electric interconnections be replaced by optical interconnections that optically connect LSIs or printed circuit boards. Any optical interconnect module is advantageous in some respects. First, it uses a signal transmission channel that exhibits virtually no frequency-dependency and causes no loss, over a range from direct current to tens of GHz. Second, it can help achieve high-speed transmission, since it is free from electromagnetic interference and makes no noise resulting from ground-potential changes.

Takai et al., "800 Mbit/s/ch×12ch, True DC-Coupled Parallel Optical Interconnects Using Single-Mode Fiber and 1310 nm LD Array," 2000 Electronic Components and Technology Conference, discloses an "optical interconnect module in which signals are transmitted in parallel through optical transmission channels or channels."

In the optical interconnect module disclosed in the Takai et al. thesis, a signal representing several Gbps of data can be allocated to each of the optical transmission channels that are available. Hence, the module can distribute data as much as several Gbps times the number of the channels available. Assume that 32 optical transmission channels are available, each being able to transmit 5 Gbps of data. Then, the module can provide optical interconnections for such a great amount of data as 160 Gbps (i.e., 20 GBps (B: byte).

In any optical interconnect module, a certain optical transmission channel is allocated to the clock signal CLK. The data used in most digital LSIs is composed of so-called "NRZ (Non Return to Zero) signals, each being a clock-signal wave that has a logic value of "0" at the valley and a logic value of "1" at the peak. That is, the clock wave is a signal that has a one-clock period. To transmit the clock waves, it is therefore necessary to use a transmission band that is about twice as broad as the data-channel band.

An optical interconnect module, in which each optical transmission channel can transmit, for example, 5 Gbps at most, needs a transmission band of about 3.5 GHz in order to transmit a digital signal wave. This is because the data signals have fundamental frequency of 2.5 GHz. In contrast, the clock signal has fundamental frequency of 5 GHz. Hence, in an optical interconnect module, which transmits the clock signal and a digital signal wave at the same time, the clock-signal channel must have twice as broad a band. To this end, two clock signals of different phases, each having twice as long a period, are transferred through two channels and are then synthesized.

The clock signal may not be transferred, for the purpose of use the interconnect channels as effectively as possible. In this case, however, a clock-extracting circuit must be employed. Further, the clock-extracting circuit can hardly extract the clock signal from the NRZ signal in some cases (for example, when the data is long-period one, i.e., "11111 … "). Thus, it is desirable to transfer the clock signal to accomplish reliable signal interconnection. In the conventional optical interconnect module, the band for the data-signal channels must therefore be limited to the narrow band for the clock-signal channel.

The conventional optical interconnect module must have many optical interconnect channels to transmit a great amount of data, inevitably because it uses as many optical interconnect channels as the data signals to transmit. Therefore, the optical transmission channel may become too broad or may lack flexibility in some cases. Further, the operating band of the optical elements and electronic circuits incorporated in the module limits the signal-transmitting band of each optical channel.

Thus, the conventional optical interconnect module is disadvantageous in several aspects. First, the band for the data-signal channels must therefore be limited to the narrow band for the clock-signal channel. Second, the optical transmission channel is too broad or lacks flexibility. Third, the operating band of the optical elements and electronic circuits limits the signal-transmitting band of each optical channel.

BRIEF SUMMARY OF THE INVENTION

An object of the present invention is to provide an optical multiplexing interconnect module that can achieve effective use of interconnect channels and can broaden the signal-transmitting band of each optical channel.

According to an aspect of the present invention, there is provided an optical interconnection module for multiplexing first and second NRZ input signals synchronous by a clock signal, comprising:

a first converting circuit configured to convert the first NRZ input signal to a first modulation signal corresponding to a first logical product between the first NRZ input signal and the clock signal;

a second converting circuit configured to convert the second NRZ input signal to a second modulation signal corresponding to a second logical product between the second NRZ input signal and an inversion clock signal obtained by inverting the clock signal; and an optical unit having an optical channel and configured to convert the first and second modulation signals to first and second optical signals, the first and second optical signals being guided into the optical channel and being multiplexed in the optical channel.

According to another aspect of the present invention, there is provided an optical interconnection module for multiplexing first and second input digital signals synchronous by a clock signal, comprising:

a first device configured to convert the first input digital signal to a first optical signal having a first amplitude;

a second device configured to convert the second input digital signal to a second optical signal having a second amplitude; and an optical unit having an optical channel and configured to guide the first and second optical signals and multiplex the first and second optical signals at a predetermined ratio in the optical channel.

DETAILED DESCRIPTION OF THE INVENTION

Hereinafter, an optical multiplexing interconnection module of the present invention will be described with reference to the accompanying drawings.

(First Embodiment)

Figure 1:
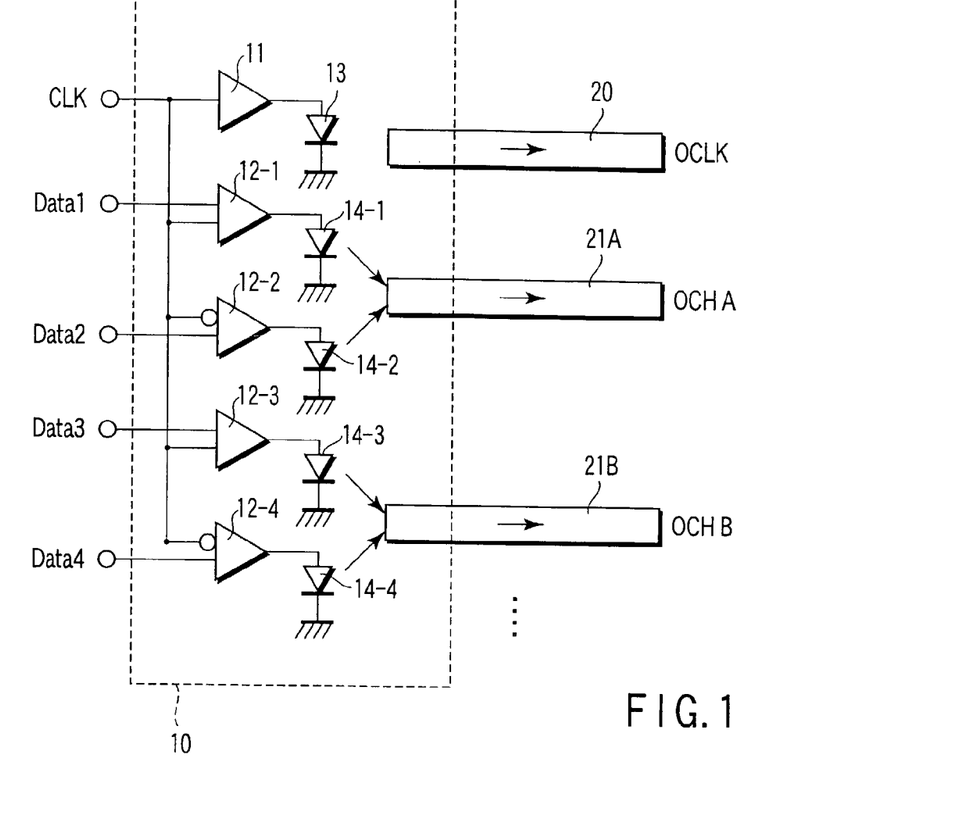
FIG. 1 is a block diagram showing schematically a light transmitting section of an optical multiplexing interconnection module according to a first embodiment of the present invention.

FIG. 1 shows a light transmitting section of an optical multiplexing interconnection module according to a first embodiment of the present invention.

In FIG. 1, reference numeral 10 denotes a light transmitting section. The light transmitting section 10 comprises light emitting devices 13, 14-1 to 14-n such as a semiconductor laser, drive circuits 11, 12-1 to 12-n for driving the light emitting devices 13, 14-1 to 14-n, optical transmission path or channel 20, 21A, 21B, ... composed of optical fiber, preferably, multi-mode optical fiber having little signal loss. Clock CLK and Data 1 to Data 4 is inputted to the light transmitting section 10. The drive circuit 11 drives the light emitting device 13 according to an input, namely, a clock CLK, and the drive circuits 12-1 to 12-n have two inputs and one of Data 1 to Data n is inputted to the one input while the clock CLK is inputted to the other one. The drive circuits 12-2, 12-4, ... invert the clock CLK. Hence, the drive circuits 12-1 to 12-n drive the light emitting devices 14-1 to 14-n in accordance with a logical product (AND) of the clock CLK or inverted clock and one of Data 1 to Data n. Beam modulated by clock OCLK is inputted to the optical fiber 20 from the light emitting device 13 as optical clock signal OCHA. Beam modulated by logical product of clock CLK and Data 1 and beam modulated by logical product of inversion clock CLK and Data 2 are inputted to the optical fiber 20A from the light emitting devices 14-1 and 14-2 and data carried by both the beams is multiplexed and transmitted through an optical fiber 20A as optical data signal OCHA. Likewise, beam modulated by logical product of clock CLK and Data 3 and inversion clock CLK and beam modulated by logical product of inversion clock CLK and Data 4 are inputted to the optical fiber 20B through the light emitting devices 14-3 and 14-4 and data carried by the both beams is multiplexed and transmitted through the optical fiber 20A as optical data signal OCHB. Although the input data is not restricted to four as shown in FIG. 1 and actually, there are several tens pieces (=n), only the four items of data will be described in this figure in order to simplify a description.

In the optical multiplexing interconnection module shown in FIG. 1, the optical device is driven by logical product signal of each input data and clock signal or each input data and inversion clock and both the clock logical product signal and inversion clock logical product signal are inputted to the optical channel. Therefore, two items of input data are multiplexed and transmitted for each optical channel signal. The operation of the optical multiplexing interconnection module will be described in detail with reference to FIGS. 2A to 2F.

Figure 2A:
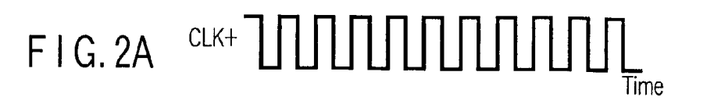
FIGS. 2A to 2F are waveform diagrams showing a signal inputted to the light transmitting section of the optical multiplexing interconnection module shown in FIG. 1.
Figure 2B:
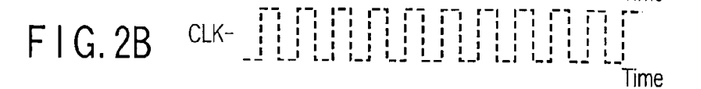
Figure 2C:
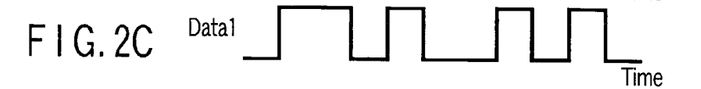
Figure 2D:
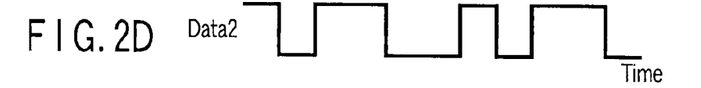
Figure 2E:
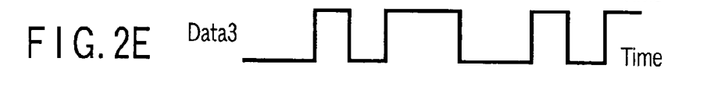
Figure 2F:
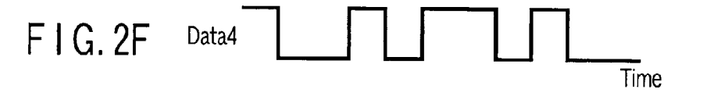
Figure 3A:
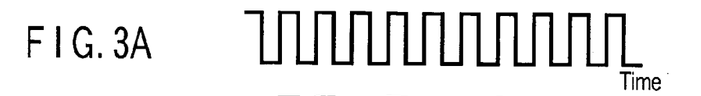
FIGS. 3A to 3E are waveform diagrams showing drive signals for driving a light emitting device in the light transmitting section of the optical multiplexing interconnection module shown in FIG. 1.
Figure 4A:
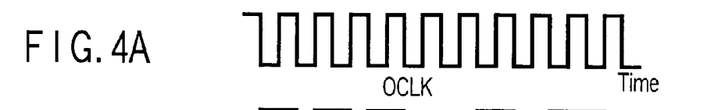
FIGS. 4A to 4C are waveform diagrams showing an optical signal outputted from a light emitting device in the light transmitting section of the optical multiplexing interconnection module shown in FIG. 1.

FIGS. 2A and 2B show waveforms of clock CLK+ and inversion clock CLK− to be processed in the respective drive circuits 11, 12-2, 12-3 and 12-2, 12-4, and FIGS. 2C to 2F show Data 1 to 4 to be inputted to the drive circuits 12-1 to 12-4. A drive signal synchronous with the clock CLK+ is outputted from the drive circuit 11 as shown in FIG. 3A. The light emitting device 13 is driven by a drive signal as shown in FIG. 3A, so that an optical clock signal OCLK as shown in FIG. 4A is generated from the light emitting device 13 and transmitted to the optical fiber 20.

Figure 3B:
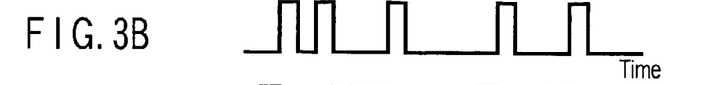
Figure 3C:
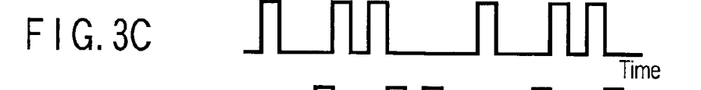
Figure 3D:
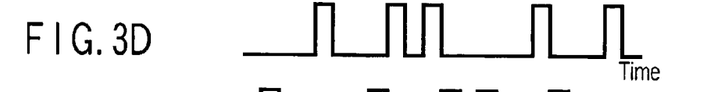
Figure 3E:
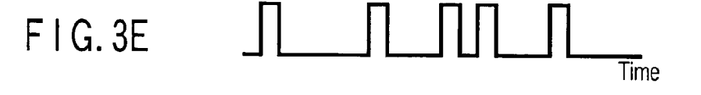
Figure 4B:
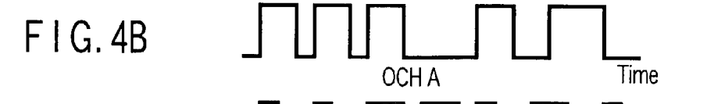
Figure 4C:
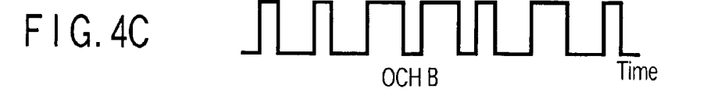

In the drive circuit 12-1, the clock CLK+ and Data 1 shown in FIG. 2A are processed and a drive signal corresponding to its logical product is generated as shown in FIG. 3B. The light emitting device 14-1 is driven by a drive signal shown in FIG. 3B. In the drive circuit 12-2, the inversion clock CLK– shown in FIG. 2B and Data 2 are processed and a drive signal corresponding to its logical product is generated as shown in FIG. 3C. The light emitting device 14-2 is driven by a drive signal shown in FIG. 3C. Beams from the light emitting devices 14-1 and 14-2 are multiplexed spatially and an optical data signal OCHA shown in FIG. 4B is transmitted into the optical fiber 21A. Likewise, in the drive circuit 12-3, the clock CLK+ shown in FIG. 2A and Data 3 are processed and a drive signal corresponding to its logical product is generated as shown in FIG. 3D. The light emitting device 14-3 is driven by a drive signal shown in FIG. 3D. In the drive circuit 12-4, the inversion clock CLK shown in FIG. 2B and Data 4 are processed and a drive signal corresponding to its logical product is generated as shown in FIG. 3E. The light emitting device 14-4 is driven by the drive signal shown in FIG. 3D. Beams from the light emitting devices 14-3 and 14-4 are multiplexed spatially and an optical data signal OCHB shown in FIG. 4C is transmitted into the optical fiber 21A.

The drive signals having waveforms shown in FIGS. 3B to 3E are return-to-zero (RZ) signals which always return to zero within clock frequency as evident from comparison with a drive signal synchronous with the clock shown in FIG. 3A. A return-to-zero (RZ) signal corresponding to logical product of clock and Data 1 and a return-to-zero (RZ) signal corresponding to inversion clock and Data 2 are generated with a shift between the both by half the frequency of the clock signal.

The light emitting devices 14-1 to 14-4 of the respective channels are driven by these RZ signals and converted to an optical signal modulated by the RZ signals. If this signal is optically coupled with the optical channels 21A and 21B, significance among the respective RZ signals is lost in the optical channels 21A and 21B because the respective optical RZ signals are shifted by half clock frequency, so that dent or swelling corresponding to a transient response waveform of the RZ signal occurs on a boundary between the RZ signals.

As a result, a modulation band of each light emitting device 13 needs to be twice the NRZ signal because data signal is RZ signal. However, because this is originally equal to a band for modulating the clock channel, it comes that a band restricted ineffectively is afforded to an original operating performance. Rather, it comes that the optical channel 21A, 21B accommodate twice signals and hence two conventionally necessary optical channels can be replaced by a single optical channel 21A or 21B. For example, if a module for transmitting 160 Gbps, which has been described about the prior art, is applied to this embodiment, the necessary optical channel 21A, 21B decreases violently from 32 channels to 17 channels.

In a parallel optical interconnect module of this embodiment, as described above, the clock channel and data channel are driven in the same band so that waste of the band is eliminated and the number of necessary optical channels becomes ½ the number of input signals plus 1, thereby signal transmission efficiency of the optical channel being improved largely.

Figure 5:
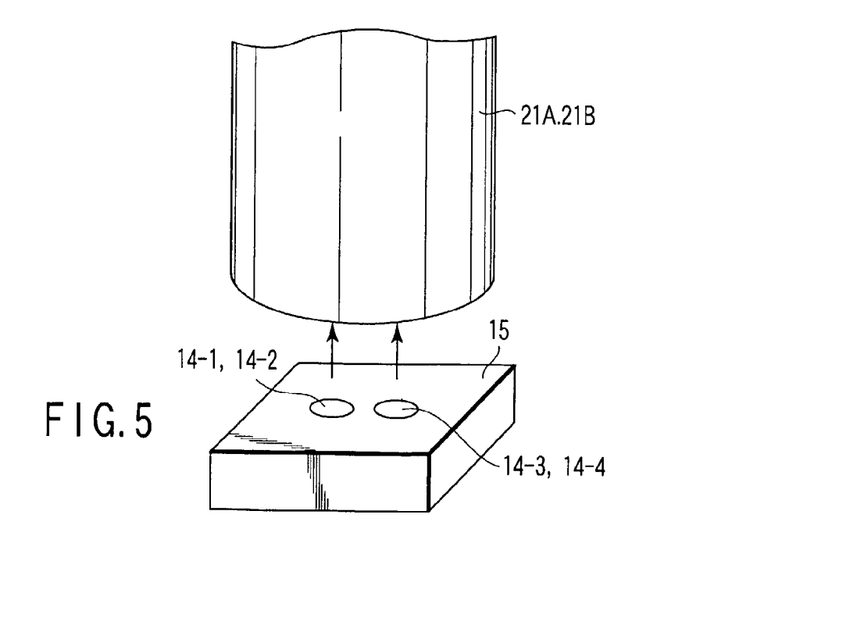
FIG. 5 is a schematic perspective view showing a structure of a signal synthesizing section in the light transmitting section shown in FIG. 1.

As for a specific structure of a signal synthesizing section of this embodiment in FIG. 1, as shown in FIG. 5, two light emitting devices 13 are created on the same substrate 15 and optically connected to the optical channel 21A or 21B. The two light emitting devices 13 can be coupled without much loss if a multi-mode optical fiber is employed for the optical channel 21A or 21B.

Next, a light receiving section for reproducing multiplexed optical signals outputted from the light transmitting section of FIG. 1 to original signals will be described with reference to FIG. 6. Basically, Data 1 to 4 are reproduced from multiplexed optical signals by executing an inverse process of multiplexing process in the optical receiving section.

Figure 6:
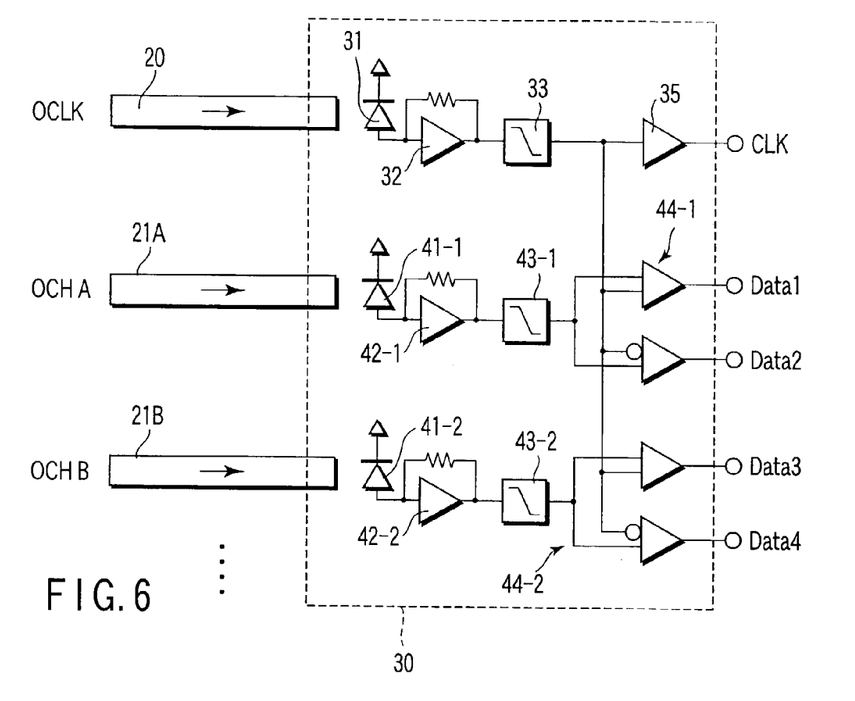
FIG. 6 is a block diagram showing schematically a light receiving section of the optical multiplexing interconnection module according to the first embodiment of the present invention.

FIG. 6 is a schematic structure diagram showing the light receiving section in the optical multiplexing interconnection module according to the first embodiment.

In the same Figure, reference numerals 20, 21A and 21B indicate the optical channels and reference numeral 3 indicates the light receiving section. This light receiving section 30 comprises beam receiving devices 31, 41-1, 41-2 such as a pin photo diode in which optical signals from the optical channels 20, 21A, 21B are inputted, current/voltage converters 32, 42-1, 42-2 such as a transformer impedance amplifier for converting a current signal from the light receiving devices 31, 41-1, 41-2 to a voltage signal, identifiers 33, 43-1, 43-2 for converting to rectangular wave by shaping the waveform of a voltage signal from the converters 32, 42-1, 42-2 and extraction and reproduction units 35, 44-1, 44-2 for extracting a logical product signal from a voltage signal from the identifiers 33, 43-1, 43-2 so as to reproduce data from this logical product signal. Here, the extraction and reproduction unit 35 for extracting the clock CLK merely functions as the delay adjuster for providing the clock signal from the identifier 33 with a delay. The extraction and reproduction units 44-1, 44-2 have a function for extracting clock logical product signal and inversion clock logical product signal of the two composite RZ signals so as to reproduce an NRZ signal from the RZ signal.

In the receiving section shown in FIG. 6, the optical clock signal shown in FIG. 4A is detected by the beam receiving device 31 and converted to a current signal. This current signal is converted to a voltage signal by the current/voltage converter 32. This voltage signal is compared with some threshold by the identifier 33 and converted to a rectangular voltage signal as shown in FIG. 4A. This rectangular voltage signal is provided, by the extraction and reproduction unit 35, with the same delay as that generated by the other extraction and reproduction unit 44 and outputted as a clock signal shown in FIG. 2A.

The optical data signal shown in FIG. 4B or 4C is detected by the beam receiving devices 41-1, 41-2 and converted to a current signal and this current signal is converted to a voltage signal by the current/voltage converters 42-1, 42-2. This voltage signal is compared with some threshold by the identifiers 43-1, 43-2 and converted to a rectangular voltage signal as shown in FIG. 4B or 4C. This rectangular voltage signal is inputted to the extraction and reproduction unit 44 and this extraction and reproduction units 44-1, 44-2 extract a clock logical product signal shown in FIG. 3B or 3D and an inversion clock logical product signal shown in FIG. 3C or 3E. That is, a logical product between a voltage signal as shown in FIG. 4B and a clock signal from the identifier 33 as shown in FIG. 4A is obtained and a clock logical product signal is generated as an RZ signal as shown in FIG. 3B. Further, a logical product between a voltage signal as shown in FIG. 4B and an inversion clock signal generated from a clock signal from the identifier 33 as shown in FIG. 4A is obtained and an inversion clock logical product signal is generated as an RZ signal as shown in FIG. 3C.

In the extraction and reproduction section 44, the inversion clock logical product signal and clock logical product signal are converted to Data 1 to 4 through a following processing. For example, in the processing of the clock logical product signal, the clock logical product signal, which is an extraction signal, is shifted by only ½ so as to generate a ½ shifted signal. Further, the clock logical product signal is shifted by a clock so as to generate a one-clock shifted signal. Both these shifted signals are synthesized so as to generate a data signal. Furthermore in the processing of the inversion clock logical product signal, the inversion clock logical product signal, which is an extraction signal, is shifted by only ½ so as to generate a ½ clock shifted signal. Further, the clock logical product signal is shifted by one clock so as to generate a one-clock shifted signal. Both these shifted signals are synthesized so as to generate a data signal. Because in this data reproduction processing, each data is shifted only by ½ clock with respect to its original clock timing, the clock signal is shifted by ½ clock frequency by a delay adjuster 35, for example, inverted. A timing when data is inputted to the light transmitting section can be restored by providing the clock with such a delay.

In the meantime, the light transmitting section 10 and the light receiving section 30 may be formed on the same substrate or on respective independent substrates. If the light transmitting section 10 and the light receiving section 30 are provided on independent substrates, the respective substrates may be optically connected using a relatively short optical fiber.

Figure 7:
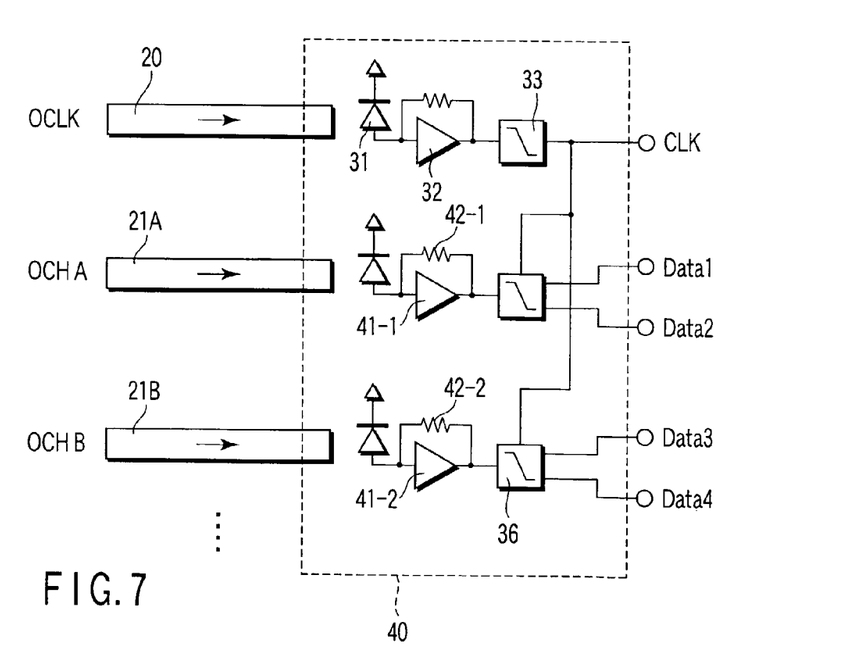
FIG. 7 is a block diagram showing schematically a light receiving section of an optical multiplexing interconnection module according to a modification of the present invention.

Next, a modification of the light receiving section for reproducing its original signal from a multiplexed optical signal will be described with reference to FIG. 7. FIG. 7 shows schematically the light receiving section in the multiplexing interconnection module. In the same figure, reference numerals 20, 21A and 21B denote an optical channel, reference numeral 40 denotes a light receiving section, reference numeral 31 denotes a light receiving device such as a pin photo diode, reference numeral 32 denotes a current/voltage converter such as a transformer impedance amplifier, reference numeral 33 denotes an identifier, and reference numerals 36-1, 36-2 denote a separator for separating the multiplexing signal synchronously with a clock edge.

In the light receiving section 40 shown in FIG. 7, an optical clock signal shown in FIG. 4A is detected by the light receiving device 31 and converted to a current signal and this current signal is converted to a voltage signal by the current/voltage converter 32. This voltage signal is compared with some threshold by the identifier 33 and outputted as a clock signal shown in FIG. 2A.

The optical data signal shown in FIG. 4B or 4C is detected by the light receiving devices 41-1, 41-2 and converted to a current signal and this current signal is converted to a voltage signal by the current/voltage converters 42-1, 42-2. This voltage signal is compared with some threshold by the separators 36-1, 36-2 and converted to a rectangular voltage signal as shown in FIG. 4B or 4C. This rectangular voltage signal is separated to respective signals from Data 1 to 4 as described below by the separators 36-1, 36-2.

Figure 8A:
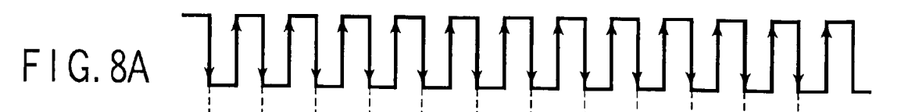
FIGS. 8A to 8D are waveform diagrams showing a signal to be processed by a separating section in the light receiving section of the optical multiplexing interconnection module shown in FIG. 7.
Figure 8B:
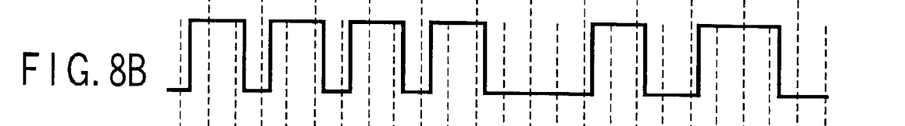
Figure 8C:
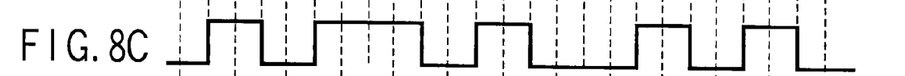
Figure 8D:
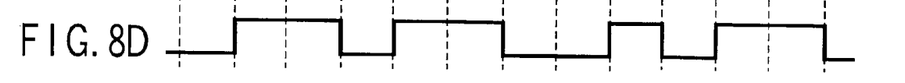

A rectangular voltage signal is inputted to the separators 36-1, 36-2 as shown in FIG. 4B or 4C. That is, a rectangular voltage signal shown in FIG. 8B analogous to the optical signal shown in FIG. 4B is inputted to the separator 36-1. The clock signal from the identifier 33 is inputted to the separators 36-1, 36-2 and shifted by ¼ the frequency as shown in FIG. 8A. In the separators 36-1, 36-2, the rectangular voltage signal shown in FIG. 8B is detected at a falling edge of the clock as shown in FIG. 8A, and an output signal corresponding to Data 1 is outputted from the separators 36-1, 36-2, depending on the level of the rectangular signal, as shown in FIG. 8C. If the rectangular voltage signal level is high, a high output is outputted from the separators 36-1, 36-2 at the falling edge of the clock and then that level is maintained. If the rectangular voltage signal level is low at the falling edge of the clock, a low output is outputted from the separators 36-1, 36-2 and that level is maintained. Thus, a signal of Data 1 is reproduced by the separators 36-1, 36-2. Likewise, in the separators 36-1, 36-2, a rectangular voltage signal shown in FIG. 8B is detected at a leading edge of the clock, as shown in FIG. 8A, and an output signal corresponding to Data 2 is outputted from the separators 36-1, 36-2, depending on the level of the rectangular signal, as shown in FIG. 8C. That is, if the rectangular voltage signal level is high at the leading edge of the clock, a high output is outputted from the separators 36-1, 36-2 and that level is maintained. If the rectangular voltage signal level is low at the leading edge of the clock, a low output is outputted from the separators 36-1, 36-2 and that level is maintained. Therefore, a signal of Data 2 is reproduced by the separators 36-1, 36-2.

An input of the identification separator 36 may be adjusted instead of the clock output of the identifier 33, such that identification timing of the separators 36-1, 36-2 becomes a timing of ¼ frequency shift timing. Because the clock leading or the clock fall is inputted every clock frequency, if the output of the identification separator 36 is maintained until a next identification timing comes, an NRZ signal is automatically reproduced. Although the two NRZ signals separated by identification are shifted by ½ clock with respect to each other, data timing can be adjusted by shifting a previously identified signal by ½ clock in the identification separator 36.

(Second Embodiment)

Next, an optical multiplexing interconnection module according to another embodiment of the present invention will be described.

Figure 9:
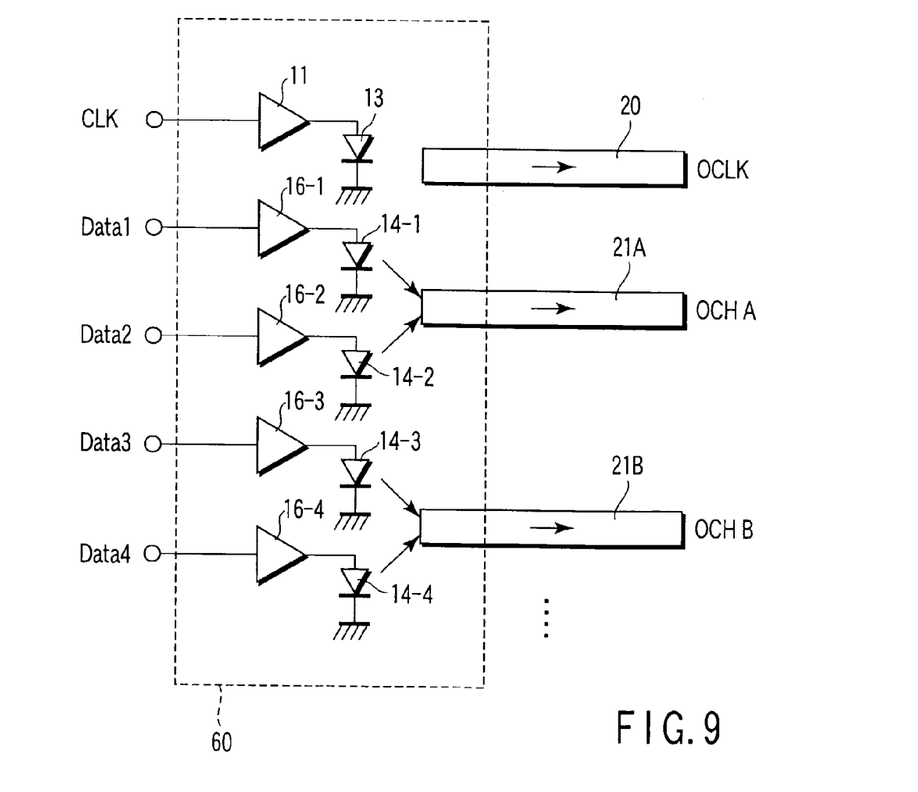
FIG. 9 is a block diagram showing schematically a light transmitting section of an optical multiplexing interconnection module according to a second embodiment of the present invention.
Figure 10A:
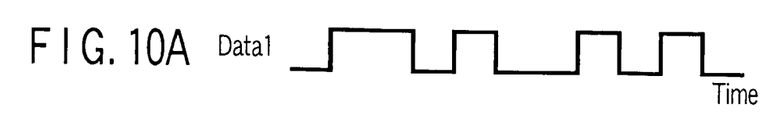
FIGS. 10A to 10D are waveform diagrams showing a signal to be inputted to the light transmitting section of the optical multiplexing interconnection module shown in FIG. 9.
Figure 10B:
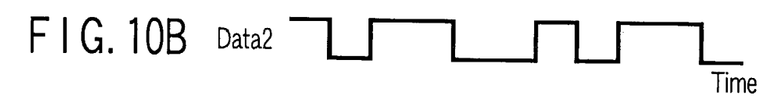
Figure 10C:
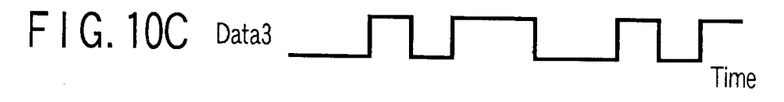
Figure 10D:
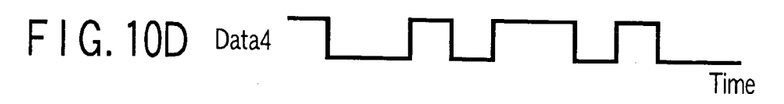

FIG. 9 is a schematic structure diagram showing an optical multiplexing interconnection module according to a second embodiment of the present invention, indicating a light transmitting section in the optical multiplexing interconnection module. The light transmitting section 60 shown in FIG. 9 comprises light emitting devices 13, 14-1 to 14-4 such as a semiconductor laser, driving circuits 11, 16-1 to 16-4 for driving the light emitting devices 13, 14-1 to 14-4 and optical channels 20, 21A, 21B such as an optical fiber.

In the light transmitting section 60 shown in FIG. 9, the drive circuit 11 drives the light emitting device 13 corresponding to a clock CLK and corresponding to respective Data 1–4, the drive circuits 16-1 to 16-4 drive the light emitting devices 14-1 to 14-4 individually. An optical signal is generated from the light emitting devices 13, 14-1 to 14-4 corresponding to the clock CLK and Data 1 to 4. An optical clock signal OCLK from the light emitting device 13 is introduced into the optical channel 20 and an optical signal from the light emitting devices 14-1, 14-2 is multiplexed spatially and inputted to the optical channel 21A as a multiplexed optical signal OCHA. An optical signal from the light emitting devices 14-3, 14-4 is multiplexed spatially and inputted to the optical channel 21B as a multiplexed optical signal OCHB.

In the transmitting section 60 shown in FIG. 9, two optical signals coupled and introduced to the optical channel 20 are so set that their respective signal amplitude is 1:2 or 2:1. To this aim, there are two ways in which with the amplitude of drive signals of the drive circuit 16 set to 1:2 or 2:1, its optical coupling efficiency between the light emitting device and optical fiber is maintained constant and in which with an equal driving amplitude of the drive circuit 16, its optical coupling efficiency is 1:2 or 2:1. The former has such a fear that there may occur a difference in optical output waveform because the driving condition of the light emitting device 13 is different although its power consumption is minimum. Alternatively, the latter has more power consumption as half light of one device is abolished although the optical output waveform of the light emitting device 13 is equal. Generally, because optical fiber is placed to aim at high speed transmission, it is desirable to employ the latter. Optical signals transmitted in this way are synthesized in the optical channel 20 and transmitted as a quarternary-value optical signal.

In a transmitting section 60 shown in FIG. 9, as shown in FIGS. 10A to 10D, Data 1 to 4 are inputted to respective drive circuits 16-1 to 16-4. The drive circuits 16-1 to 16-4 generate drive signals shown in FIGS. 11A to 11D and the light emitting devices 14-1 to 14-4 are driven by this drive signal. Hence, optical signals shown in FIGS. 11A to 11D are generated from the light emitting devices 14-1 to 14-4 and optical signals from the light emitting devices 14-1, 14-2 are inputted to the optical channel 21A, so that a multiplexed optical signal OCHA shown in FIG. 12A is transmitted through the optical channel 21A. Likewise, optical signals from the light emitting devices 14-3, 14-4 are inputted to the optical channel 21B and a multiplexed optical signal OCHB shown in FIG. 12B is transmitted through the optical channel 21B.

Figure 11A:
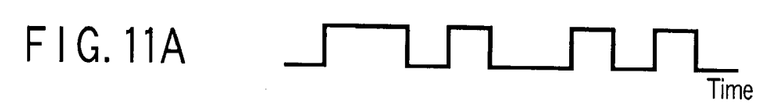
FIGS. 11A to 11D are waveform diagrams showing a drive signal for driving a light emitting device in the light transmitting section of the optical multiplexing interconnection module shown in FIG. 9.
Figure 11B:
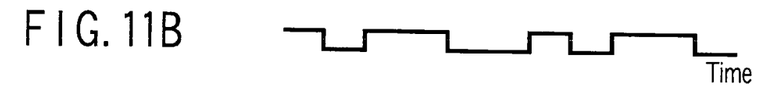
Figure 11C:
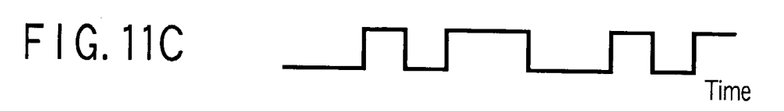
Figure 11D:
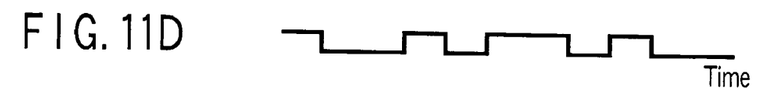
Figure 12A:
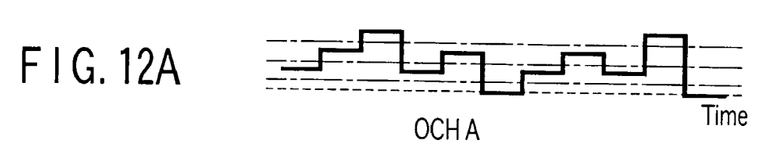
FIGS. 12A and 12B are waveform diagrams showing an optical signal outputted from a light emitting device in the light transmitting section of the optical multiplexing interconnection module shown in FIG. 9.
Figure 12B:
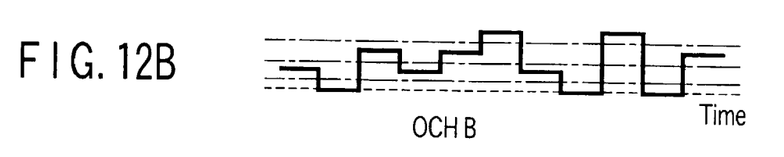

The first and second optical signals introduced to the optical channel 21A or 21B with amplitude ratio of 1:2 or 2:1 and synthesized are analogous to their original data waveforms as shown in FIGS. 11A, 11B. If these are synthesized, the multiplexed optical signal becomes a simple overlapping waveform and the multiplexed optical signal is a quarternary-value signal, which adopts four stages of value from level 0 to level 3, so that the multiplexed optical signal has level 0, 1, 2, 3 at a timing in which the amplitude of two optical signals is "0", only one having the amplitude 1 of the two optical signals is "1", only the other one having the amplitude 2 is "1", and the two signals are both "1". If expressing in digital (binary) arithmetic operation, they correspond to signals from "00" to "11" and the multiplexed optical signal corresponds to transmission of 2-bit information in a 1-bit period so that double signal band is acquired.

In a signal synthesizing section of the embodiment shown in FIG. 7, as shown in FIG. 5, two light emitting devices 14-1 to 14-4 are formed on the same substrate so as to couple optically to the optical channels 21A, 21B. If the multi-mode optical fiber is employed for the optical channel 20, beams from two light emitting devices 14-1 to 14-4 can be coupled with a low loss, so that adjustment of the amplitude based on optical coupling efficiency is enabled by deflecting the optical channel on the side of a light emitting device having the amplitude 2.

Figure 13:
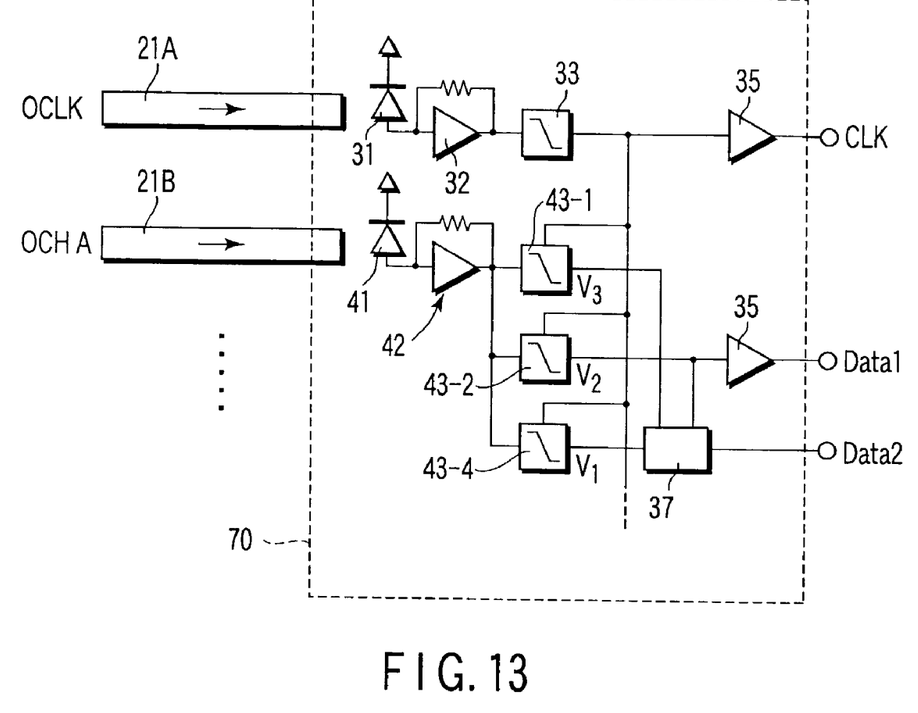
FIG. 13 is a block diagram showing schematically the light receiving section in the optical multiplexing interconnection module according to the second embodiment of the present invention.

A light receiving section for reproducing multiplexed optical signal from the light transmitting section shown in FIG. 9 to its original signal will be described with reference to FIG. 13. FIG. 13 is a schematic structure diagram showing the light receiving section in the optical multiplexing interconnection module according to the second embodiment.

A light transmitting section 70 shown in FIG. 9 comprises beam receiving devices 31, 41 such as a pin photo diode for detecting an optical signal from optical channels 21A and 21B, current/voltage converters 32, 42 such as a transformer impedance amplifier, identifiers 33, 43-1 to 43-4, a reproduction processing section 37, and a delay adjuster 35 for compensating for a delay generated upon computing reproduction in the reproduction processing section 37.

In the light transmitting section 70 shown in FIG. 9, an optical clock signal is detected by the beam receiving device 31 and converted to an electric signal and this electric signal is converted to a voltage signal by the current/voltage converter 32. This voltage signal is compared with some threshold by the identifier 33 and converted to a rectangular voltage signal as shown in FIG. 4A. This rectangular voltage signal is provided by the same delay as that generated by the reproduction processing section 37 by the delay adjuster 35 and outputted as a clock signal as shown in FIG. 2A.

Optical data signal indicated by FIG. 12A or 12B is detected by the beam receiving devices 41-1, 41-2 and converted to a current signal and this current signal is converted to voltage signals V1, V2, V3 by the current/voltage converter 42. The voltage signals V1, V2, V3 have a quaternary-value (level 1=V1, level 2=V2, level 3=V3) and are identified as a binary value with three thresholds Th1, Th2, Th3 indicated by a one-dot chain line in FIG. 12A or 12B synchronously with a clock in the identifiers 43-1 to 43-3. That is, a voltage signal having a voltage V3 larger than the threshold Th3 is outputted from the identifier 43-3, a voltage signal having a voltage V2 smaller than the threshold Th3 and larger than the threshold Th2 is outputted from the identifier 43-2 and a voltage signal having a voltage V2 smaller than the threshold Th2 and larger than the threshold Th1 is outputted from the identifier 43-2.

An identification value (B) of level 2 (=V2) corresponds to an optical signal having its original amplitude 2. Hence, for example, Data 1 is outputted as a reproduction signal having level 0 in the period of level 2. Next, the reproduction processing section 37 subtracts an identification value (B) of level 2 (= V2 ) from an identification value (A) having level 3 (= V3) by binary computation (A−B) so as to exclude a signal of the original amplitude 2. A signal as a result of subtraction (A−B) corresponds to an identification value (c) of level 1 (=V1) and by outputting a voltage waveform having level 1 (=V1) outputted from the identifier 43-1 to a voltage waveform having level 1 (=V1), for example, Data 2 is outputted as level 0 in the period of level 1.

Figure 14:
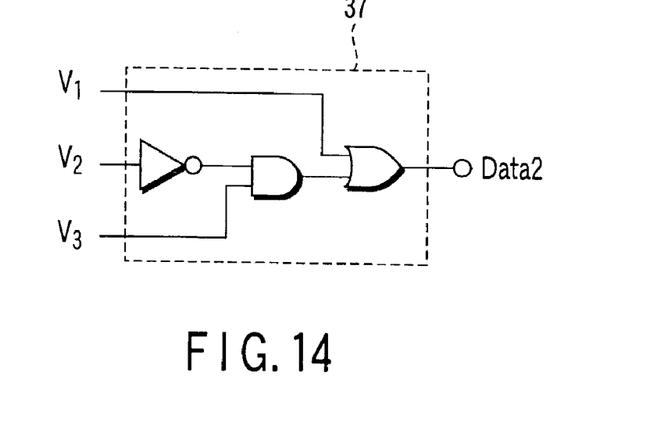
FIG. 14 is a circuit diagram showing a circuit configuration of a reproduction processing circuit in the light receiving section shown in FIG. 13.

The reproduction processing section 37 is constituted of a circuit shown in FIG. 14. That is, a following computation is realized in a simple logical circuit structure as shown in FIG. 14. In a circuit shown in FIG. 14, a logical negative value (NOT) of an identification value (A) of level 2 is outputted from a NOT circuit and a logical product between this logical negative value (NOT) and an identification value (B) of level 3 (=V3) is obtained by an AND circuit so as to exclude a signal having the amplitude 2. Next, a logical sum having an identification value (C) of level 1 (=V1) is outputted to a logical product as shown in FIG. 14 from an OR circuit ((A−B)+C) so as to reproduce a signal having the amplitude 1.

According to this embodiment, signal transmission capacity per optical channel can be doubled, so that the same effect as the first embodiment is obtained. Further, this can be achieved easily only by considering a coupling ratio of two light emitting devices to an optical channel, without any complicated electronic circuit upon synthesizing two NRZ signals.

Figure 15:
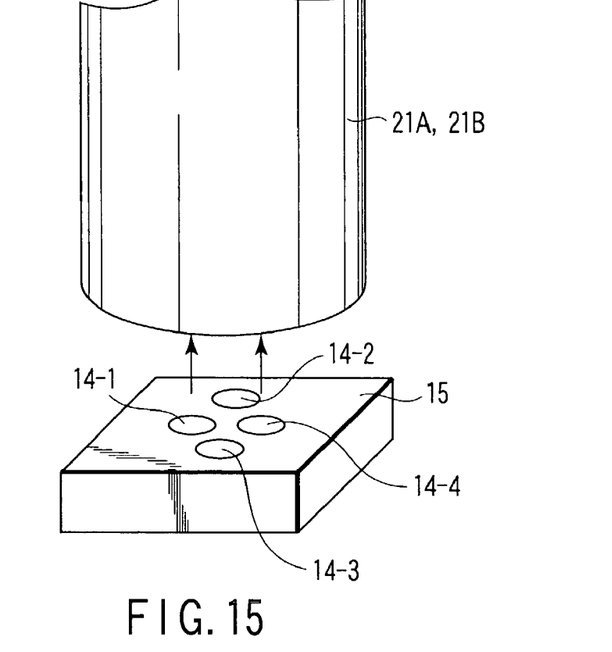
FIG. 15 is a perspective view showing schematically an another structure of a signal synthesizing section in the light transmitting section shown in FIG. 9.
Figure 16:
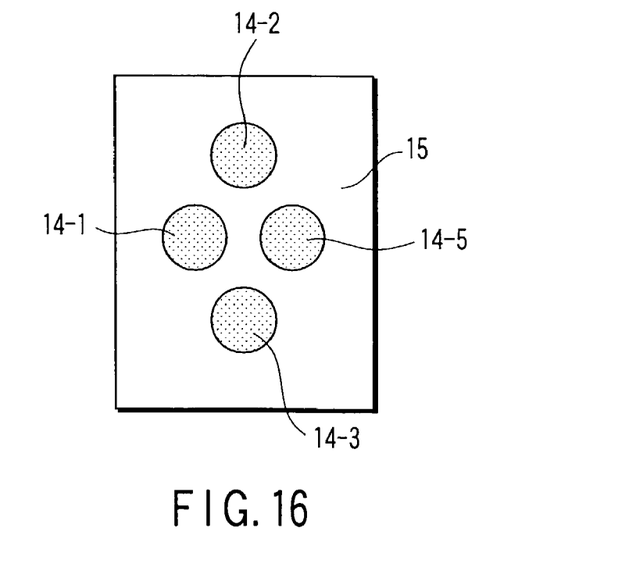
FIG. 16 is a plan view showing schematically an example of arrangement of the light emitting devices of the signal synthesizing section in the light transmitting section shown in FIG. 9.

It is permissible to combine the first embodiment and the second embodiment. For example, four light emitting devices 14-1 to 14-4 are formed on the same substrate 15 as shown in FIG. 15. Further, as shown in FIG. 16, each light emission point of the light emitting devices 14-1 to 14-4 is disposed at each vertex of a diamond as shown in FIG. 16 and this light emission point is coupled to each optical fiber optically. By adjusting positions of the light emission points of the light emitting devices 14-1 to 14-4, four RZ signals from the light emission points of the light emitting devices 14-1 to 14-4 are coupled in terms of the amplitude with a ratio of 1:2 with respect to optical fiber so that the composite RZ signals can be multiplexed as a quaternary-value signal. That is, the signal transmission capacity per optical channel can be magnified by four times.

In the meantime, the present invention is not restricted to the above-described respective embodiments. Although according to the embodiment, respective light emitting devices are driven by Data 1 and Data 2 so as to synthesize beams from the respective light emitting devices by inputting to the optical channel, it is permissible to drive a light emitting device after two data are synthesized in the state of an electric signal. Although on the signal reproduction side, a clock signal from a transmission side is inputted through the optical channel, the input of this clock signal is not always necessary. Because the input data contains a clock signal, it is permissible to extract this clock from the input data for use.

The light emitting device is not restricted to a semiconductor laser but it is permissible to use a light emission diode. Likewise, the light receiving device is not restricted to the pin photo diode and it is permissible to use a pn-junction photo diode or a photo transistor. Further, the optical channel is not restricted to the optical fiber but an optical waveguide path formed on a substrate may be used instead.

As described above, according to the present invention, clock signal band and data signal band can be equalized and by transmitting multiplexed optical signals, improvement of optical channel efficiency and expansion of signal capacity per optical channel can be achieved. Further according to the present invention, in the parallel optical channels for transmitting the clock signal simultaneously, each data channel can contain an equal signal band to the clock channel or a signal channel capacity double conventionally. Therefore, the data transmission capacity of the optical channel is not limited to the clock signal band but can be maximized. Further, doubling the channel capacity rate with the multiplexed signal is enabled so that the signal capacity per optical channel can be increased twice or four times.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical interconnection module for multiplexing first and second NRZ input signals synchronous by a clock signal, comprising:
    a first converting circuit configured to convert the first NRZ input signal to a first modulation signal corresponding to a first logical product between the first NRZ input signal and the clock signal;
    a second converting circuit configured to convert the second NRZ input signal to a second modulation signal corresponding to a second logical product between the second NRZ input signal and an inversion clock signal obtained by inverting the clock signal;
    an optical unit having an optical channel and configured to convert the first and second modulation signals to first and second optical signals, the first and second optical signals being guided into the optical channel and being multiplexed in the optical channel;
    a third converting circuit configured to convert the multiplexed optical signal from the optical channel into a multiplexed electric signal;
    a first producing circuit configured to produce a first logical product signal between the inputted multiplexed electric signal and the clock signal and;
    a second producing circuit configured to produce a second logical product signal between the multiplexed electric signal and an inverted clock signal obtained by inverting the clock signal; and
    an output circuit configured to convert the first logical product signal and second logical product signal to first and second digital output signals corresponding to the first and second NRZ input signals and output first and second digital output signals, respectively.

2. The optical interconnection module according to claim 1, further comprising a fourth converting circuit configured to convert the clock signal to a clock optical signal, wherein the optical unit includes a second optical channel configured to transmit the clock optical signal.

3. The optical interconnection module according to claim 2, further comprising a fifth converting circuit configured to convert the clock optical signal to the clock signal.

4. The optical interconnection module according to claim 3, further comprising a delay circuit configured to delay the clock signal.

5. An optical interconnection module for multiplexing first and second NRZ input signals synchronous by a clock signal, comprising:
    a first converting circuit configured to convert the first NRZ input signal to a first modulation signal corresponding to a first logical product between the first NRZ input signal and the clock signal;
    a second converting circuit configured to convert the second NRZ input signal to a second modulation signal corresponding to a second logical product between the second NRZ input signal and an inversion clock signal obtained by inverting the clock signal;
    an optical unit having an optical channel and configured to convert the first and second modulation signals to first and second optical signals, the first and second optical signals being guided into the optical channel and being multiplexed in the optical channel;
    a third converting circuit configured to convert the multiplexed optical signal to a multiplexed electric signal; and
    an outputting circuit configured to output first and second digital output signals corresponding to the first and second NRZ input signals, respectively, the multiplexed electric signal and the clock signal being inputted in the outputting circuit, one of the multiplexed electric signal and the clock signal being phase-shifted in the outputting circuit, the first digital output signal being produced from the multiplexed electric signal in response to a reading edge of the clock signal, and the second digital output signal being produced from the multiplexed electric signal in response to a falling edge of the clock signal.

6. The optical interconnection module according to claim 5, wherein the outputting circuit includes a phase-shift circuit configured to shift one of the first and second digital output signals by one phase of the clock signal.

7. The optical interconnection module according to claim 5, further comprising a fourth converting circuit configured to convert the clock signal to a clock optical signal, wherein the optical unit includes a second optical channel configured to transmit the clock optical signal.

8. The optical interconnection module according to claim 7, further comprising a fifth converting circuit configured to convert the clock optical signal to the clock signal.

* * * * *